Oct. 10, 1967     A. N. LADER     3,346,071
MUFFLER CONSTRUCTION FOR MOTORCYCLES
Filed Nov. 5, 1964

ALLAN N. LADER
INVENTOR.

BY BUCKHORN, BLORE, KLARQUIST & SPARKMAN
ATTORNEYS

United States Patent Office 3,346,071
Patented Oct. 10, 1967

3,346,071
MUFFLER CONSTRUCTION FOR MOTORCYCLES
Allan N. Lader, 750 NW. 5th St.,
Gresham, Oreg. 97030
Filed Nov. 5, 1964, Ser. No. 409,170
7 Claims. (Cl. 181—56)

This invention relates to a muffler construction for the internal combustion engine of a motor vehicle, such as a motorcycle.

The standard full-sized motorcycle will ordinarily come equipped with a muffler not too different from that employed on an automotive vehicle. In recent years, a lighter weight motorcycle, such as the "Honda" has come into wide popularity and the muffler system on such a light weight motorcycle is normally not nearly so sophisticated and complicated as that on a full-size standard motorcycle. In fact, many of the light weight motorcycles come equipped with a so-called "snuffer" installed in the end of the exhaust pipe thereof. The "snuffer" is a baffle type unit that fits in the exhaust pipe and serves to muffle the noise of the engine. Unfortunately, it also raises the back pressure against which the engine must work, and thus decreases the effective horsepower of the engine.

The prior patent to Christman 2,492,784 shows a motorcycle having a butterfly cut-out construction with a removable baffle, the baffle being removable and the butterfly being turnable to a non-obstructing position to leave the exhaust pipe virtually unobstructed. This general arrangement is advantageous because it enables the noise to be suppressed in the city, where the horsepower is not too important, but enables the driver to open up the exhaust pipe and increase the effective horsepower of the motorcycle when the motorcycle is in use on highways or hill climbing or used in off-the-road places.

It is the main object of the present invention to provide a muffler construction which is simpler and less expensive than prior art constructions and yet accomplishes the functions of the prior art constructions.

A further object of the invention is to provide a muffler for a motorcycle wherein the butterfly is so constructed that in one position it acts to muffle the sound of the engine, but in another position leaves the exhaust pipe open for increased horsepower delivery by the engine.

A further object of the invention is to provide a butterfly assembly that can be readily installed in the exhaust pipe of a light weight motorcycle in place of the existing snuffer unit, and without modification of the exhaust pipe, or if the pipe has no snuffer unit or installation hole for such a unit, my snuffer unit can be mounted in place by merely forming a single hole in the exhaust pipe.

Various other objects of the invention will be apparent from the following description taken in connection with the accompanying drawings, wherein.

Figure 1:
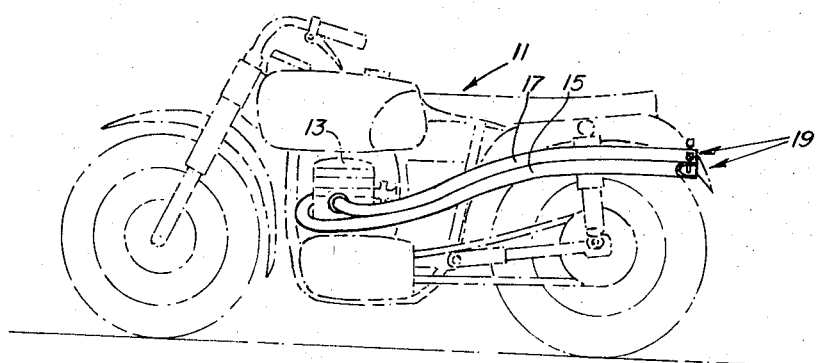
FIG. 1 is a view of a light weight motorcycle having a dual exhaust system shown equipped with the muffler arrangement of my invention.

Referring to FIG. 1 of the drawings, the light weight motorcycle 11 is shown as having an engine 13 equipped with dual exhaust pipes 15 and 17. Each pipe is shown as equipped with a snuffer assembly 19 of my invention.

My snuffer assembly is best shown in FIGS. 2–6, where it is evident that the assembly includes a butterfly member 31 (FIG. 4) having a flat, ring-shaped body portion 33 from the outer edge of which projects an integral straight operating arm or stem 35. The ring portion has an outer diameter substantially less than that of the interior of the exhaust pipe for a reason to be presently explained. The butterfly member can be formed from a flat metal plate or sheet by a simple stamping operation.

Figure 3:
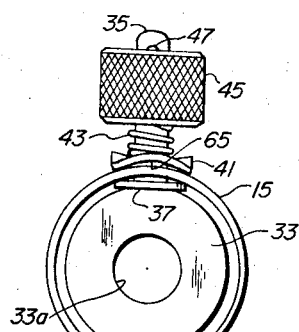
FIG. 3 is an end view taken along line 3—3 of FIG. 2.
Figure 5:
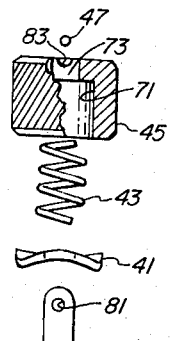
FIG. 5 is a plan view of the butterfly actuating knob taken in the direction of the arrows 5—5 of FIG. 2.
Figure 5:
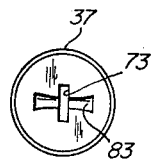
Figure 6:
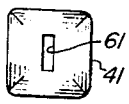
FIG. 6 is a top view of the detent of my snuffer assembly.

Fitted on the arm 35 is a simple washer 37 which abuts against the interior of the pipe 15, in the assembled and installed condition of my snuffer assembly as is evident from FIG. 3, to dispose the ring-shaped portion 33 in concentric spaced relation with respect to the exhaust pipe 15.

My snuffer assembly also includes a quadrilateral detent 41, a compression spring 43, a knurled knob 45, and a retaining pin 47, about which more will be stated presently.

Figure 9:
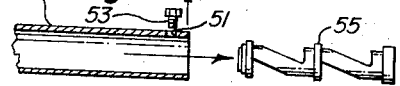

The exhaust pipe 15 will normally have a hole 51 (see FIG. 9) formed therein adjacent its exhaust end to receive a mounting bolt 53 which normally secures a conventional snuffing unit 55 in place in the pipe 15.

Figure 8:
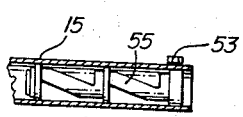
FIGS. 8 through 10 show various steps in the conversion of an existing muffler construction to my muffler construction, and showing the removal of the existing snuffer unit and the installation of my butterfly assembly.
Figure 10:

To convert the exhaust muffler construction shown in FIG. 8 to my muffler construction, the bolt 53 is removed and thereafter the snuffer unit 55 is withdrawn (FIG. 9) from the pipe 15. Then the operating arm 35 of my butterfly member 31 is inserted through the hole 51 from the inside of the pipe generally in the manner shown in FIG. 10. Then the butterfly member is arranged in an upright fashion as shown in FIG. 2, either before or after the detent 41 and the spring 43 are placed on the arm 35.

Figure 2:
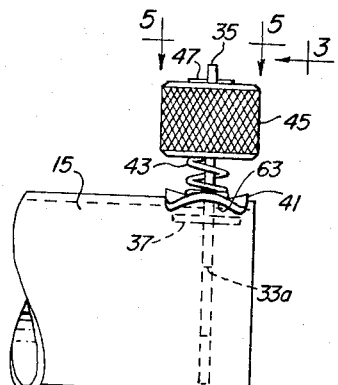
FIG. 2 is an enlarged view of the discharge end portion of one of the exhaust pipes shown in FIG. 1, with the butterfly shown in muffling position.
Figure 4:
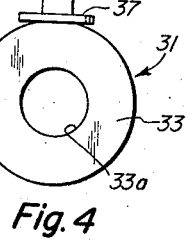
FIG. 4 is an exploded view of the snuffer assembly of my invention, with parts broken away for convenience in illustration.

The detent 41 has a rectangular slot 61 formed centrally therein of a size to slidably receive the arm 35, which is also of rectangular cross section as is evident by a comparison of FIGS. 2–4. Thus the detent 41 is non-rotatably mounted on the arm 35.

The compression spring 43 surrounds the stem or arm 35 and bears against the upper surface of the detent 31 and fits into a counterbore 71 and against a shoulder 73 formed in the knob 45. The knob 45 has a bore 73 formed centrally therethrough, the bore being of rectangular cross section and of a size to slidably receive the arm or stem 35. The knob is thus non-rotatably mounted on the arm 35.

The arm 35 has a hole 81 formed therethrough adjacent to the free end thereof and the pin 47 fits in the hole 81 and is seated in a recess 83 formed in the top surface of the knob 45 to releasably retain my snuffer assembly in place in the exhaust pipe.

The detent 41 initially is a flat quadrilateral piece of metal but is deformed to form two tunnel like saddle portions 63 and 65 (FIGS. 2 and 3) intersecting one another at right angles. Each saddle portion is of a size so that when it is aligned with the exhaust pipe 15, it fits thereon in generally nesting fashion so as to resist turning movement of the butterfly member. The butterfly member is thus releasably latched in one of two positions 90° from one another, depending on which saddle member is aligned with the pipe 15.

The butterfly member may be turned from one position to another by applying a sufficient force to the knob 45 to compress the spring 43 and allow the detent 41 to shift upwardly and ride around on the exhaust pipe until the other saddle portion is aligned with the exhaust pipe. Thus the butterfly member can be optionally positioned either in the position shown in FIG. 2, in which the plane of the butterfly member is normal or perpendicular to the length of the pipe 15, or the butterfly member may be positioned 90° therefrom in which the plane of the butterfly member is substantially contained within the vertical plane containing the axis of the exhaust pipe.

In operation, with the butterfly member arranged as shown in FIG. 2, the sound of the exhaust is effectively muffled. I have discovered that by providing a ring-shaped member of the type shown in FIGS. 2 and 3, wherein the peripheral edge of the member is substantially spaced from the interior of the pipe and wherein the member has a central hole formed therein of substantial size, the sound of the exhaust is effectively muffled. When the butterfly member is turned 90° from its FIG. 2 and 3 positions, it is presented edgewise to the interior of the exhaust pipe 15 where it leaves the exhaust pipe substantially unobstructed enabling the effective horsepower of the motorcycle engine to be increased.

It is pointed out that the detent 41, in addition to serving the purpose of releasably maintaining the butterfly member in one of two positions, also functions to retain the butterfly member in an upright position. It will be remembered that the stem 35 is of rectangular cross section and fits in a circular hole 51 in the exhaust pipe. Thus, per se, there is nothing holding the butterfly member upright merely by virtue of the stem 53 passing through the exhaust pipe 51. However, the generally flat detent 41 fits in nesting relation on the pipe 15 in the position shown in FIG. 2 and the mere fact that the spring 41 is disposed in compressed condition between the detent 41 and the knob 45 urges the butterfly member to remain in an upright condition against forces tending to urge it to assume other positions.

In connection with the relationship of the size of the ring-shaped portion 33 to the pipe 15, I have found that the diameter of the opening 33a in the ring-shaped member should be greater than one-third the radius of such member. I have further found that the area of the annular space between the periphery of the ring-shaped member and the interior of the exhaust pipe must be of substantial size in relation to the area of the opening in the pipe, and specifically at least one-half of the area of such opening and preferably greater than the area of the opening. However, I have also found that for maximum results the area of the annular space should be less than twice the area of the opening. While I have shown a single opening in the center of the body portion of the butterfly member and this construction is preferable, is is conceivable that the same effective opening can be achieved in other ways, such as, for instance, providing two closely located openings separated by a central bar.

Figure 7:
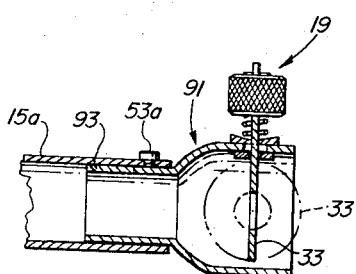
FIG. 7 is a vertical midsectional view through a modified form of my invention, taken on a scale somewhat smaller than that shown in FIG. 2.

FIG. 7 shows a modified form of the invention in which it is assumed that the exhaust pipe 15a is of substantially smaller diameter than that shown in FIG. 2, and yet it is desired to use the same size snuffer assembly shown in FIG. 2 in association with the exhaust pipe 15a. This can be accomplished by use of an adapter member 91 I have provided which has a small diameter portion 93 of a size to fit within the pipe 15a, such portion being held in place by a bolt 53a. The adapter element 91 is then flared outwardly to provide a larger diameter portion 95 of the same size as the exhaust pipe 15 of FIG. 2. My snuffer assembly 19 is then installed in the larger portion 95 through an opening 51a formed therein for the purpose of rotatably receiving the butterfly member of the butterfly assembly 19.

While my invention has been explained in connection with a light weight motorcycle, the invention is not intended to be limited particularly thereto and conceivably my snuffer assembly could be employed on other types of motor vehicles. While my snuffer assembly finds particular application in an inexpensive conversion of many of the existing muffler systems, my snuffer assembly could also be provided as original equipment on the motorcycle exhaust system.

Preferably all the parts of my snuffer assembly are of corrosion resistant metal such as stainless steel, with the exception of the knob 45. In connection with the knob, I prefer to make it of a material of high heat conductivity, such as for instance, aluminum. It is pointed out that the only contact of the knob with the butterfly member is at the slot or bore 73, and its only other contact with other parts of the assembly is with the spring 43 which in turn is in minor engagement with the stem 35 and the detent 41, which in turn is in contact with the pipe 15. Because of the limited contact of the knob 45 with the butterfly member, my knob will remain relatively cool despite the same being in use on a motorcycle operating over long periods of time. Apparently the exposure of the knob to the air stream also tends to cool it, but in any event, despite the fact that the butterfly member 31 may be at a temperature much too hot to touch, the knob 45 remains relatively cool and can be grasped to turn the butterfly member from one position to another.

It is known that certain motorcycle manufacturers put out motorcycles wherein the exhaust pipe has neither a snuffer unit nor an opening formed in the exhaust pipe for such a unit. Under the circumstances, a hole may be readily formed in the exhaust pipe adjacent to the exhaust end thereof to receive my butterfly snuffer assembly.

Having described the invention in what is considered to be the preferred embodiment thereof, it is desired that it be understood that the invention is not to be limited other than by the provisions of the following claims.

I claim:
1. In a muffler construction for the internal combustion engine of a vehicle such as a motorcycle,
   exhaust pipe means,
   sound muffling means in said exhaust pipe means,
   and means mounting said sound muffling means for movement from a sound muffling position to an unobstructed, non-muffling position,
   said sound muffling means comprising a butterfly member,
   said butterfly member including a ring shaped portion disposed in a portion of the exhaust pipe means which is of circular cross section,
   said mounting means mounting said butterfly member for movement from a position where said ring shaped portion is in concentric relation to the exhaust pipe means, to a position where the plane of the ring shaped portion is parallel to the axis of said exhaust pipe means,
   said ring shaped portion having an outer diameter less than the internal diameter of said exhaust pipe portion by an amount such that the annular area between the ring shaped portion and said pipe means portion when such portions are in concentric relation, is at least one-half the area of the opening of the ring shaped member.

2. In a muffler construction for the internal combustion engine of a vehicle such as a motorcycle,
   exhaust pipe means,
   sound muffling means in said exhaust pipe means,
   and means mounting said sound muffling means for movement from a sound muffling position to an unobstructed, non-muffling position,
   said sound muffling means comprising a butterfly member,
   said butterfly member including a ring shaped portion disposed in a portion of the exhaust pipe means which is of circular cross section,
   said mounting means mounting said butterfly member for movement from a position where said ring shaped portion is in concentric relation to the exhaust pipe means, to a position where the plane of the ring shaped portion is parallel to the axis of said exhaust pipe means, said ring shaped portion having an outer diameter less than the internal diameter of said exhaust pipe portion by an amount such that the annular area between the ring shaped portion and said pipe means portion when such portions are in concentric relation, is at least one-half the area of the opening of the ring shaped member, said butterfly member having a stem projecting therefrom through an opening in the exhaust pipe means, said stem being of non-circular cross section at least in certain portions thereof, a detent plate slidably but non-rotatably received on said stem and having at least two selective positions for engagement with said exhaust pipe means where it is closer to said exhaust pipe means than at other positions thereof, spring means urging said detent plate against said exhaust pipe means, and manual means on said stem by which it and thus the butterfly member may be turned.

3. In a muffler construction for the internal combustion engine of a vehicle such as a motorcycle, exhaust pipe means, sound muffling means in said exhaust pipe means, and means mounting said sound muffling means for movement from a sound muffling position to an unobstructed, non-muffling position, said sound muffling means comprising a butterfly member, said butterfly member including a ring shaped portion disposed in a portion of the exhaust pipe means which is of circular cross section, said mounting means mounting said butterfly member for movement from a position where said ring shaped portion is in concentric relation to the exhaust pipe means, to a position where the plane of the ring shaped portion is parallel to the axis of said exhaust pipe means, said ring shaped portion having an outer diameter less than the internal diameter of said exhaust pipe portion by an amount such that the annular area between the ring shaped portion and said pipe means portion when such portions are in concentric relation, is at least one-half the area of the opening of the ring shaped member, said butterfly member having a stem projecting therefrom through an opening in the exhaust pipe means, washer means around said stem and engaging the interior of the exhaust pipe means, said washer means being of such size as to dispose said ring shaped portion in concentric relation to the mentioned portion of the exhaust pipe means, and means on the stem by which the butterfly member may be turned from a concentric position in relation to the exhaust pipe means to an edgewise position.

4. In a muffler unit for the exhaust pipe of an internal combustion engine wherein the exhaust pipe means has an opening formed therein near the exhaust end thereof, said unit including an essentially flat butterfly member which includes a ring shaped portion and a single non-circular stem portion integrally projecting from the ring shaped portion in the plane of the ring shaped portion and adapted for projection through the opening in the exhaust pipe means, a washer slidably mounted on said stem for engaging the interior of said exhaust pipe means, a detent member slidably but non-rotatably mounted on said stem for engaging the exterior of the exhaust pipe means, knob means non-rotatably mounted on said stem, and spring means between said detent member and said knob means.

5. In a muffler unit for the exhaust pipe of an internal combustion engine wherein the exhaust pipe means has a lateral opening formed therein near the exhaust end thereof, said unit including a plate-like butterfly member which includes a perforated, disc-shaped portion and a single non-circular stem portion integrally projecting from the disc-shaped portion and adapted for projection through the opening in the exhaust pipe means, a detent member keyed to said stem for engaging the exterior of the exhaust pipe means, actuating means keyed to said stem, and spring means urging said detent member against the exhaust pipe means.

6. The muffler unit of claim 5 including a spacer member on the stem portion to space the disc-shaped portion from the exhaust pipe means.

7. In a muffler unit for the exhaust pipe of an internal combustion engine wherein the exhaust pipe means has an opening formed therein near the exhaust end thereof, said unit including an essentially plate-like butterfly member which includes a perforated, disc-shaped portion and a single non-circular stem portion integrally projecting from the disc-shaped portion in the plane of the disc-shaped portion and adapted for projection through the opening in the exhaust pipe means, a slotted detent member slidably but non-rotatably mounted on said stem for engaging the exterior of the exhaust pipe means, actuator means non-rotatably mounted on the outer end of said stem, and compression spring means between said detent member and said actuator means.

References Cited

UNITED STATES PATENTS

| | | | |
|---|---|---|---|
| 1,153,097 | 9/1915 | Miller | 181—65 |
| 1,366,632 | 1/1921 | Carlen | 181—60 X |
| 1,375,621 | 4/1921 | Wright | 181—69 X |
| 2,401,858 | 6/1946 | Clark | 60—29 X |
| 2,492,784 | 12/1949 | Christman | 181—38 X |

FOREIGN PATENTS

| | | |
|---|---|---|
| 955,056 | 4/1964 | Great Britain. |
| 355,145 | 12/1937 | Italy. |
| 483,078 | 7/1953 | Italy. |

RICHARD B. WILKINSON, *Primary Examiner.*

ROBERT S. WARD, JR., *Examiner.*